(No Model.)
C. P. TURNER.
DYNAMO ELECTRIC MACHINE AND ELECTRIC MOTOR.
No. 578,280. Patented Mar. 2, 1897.
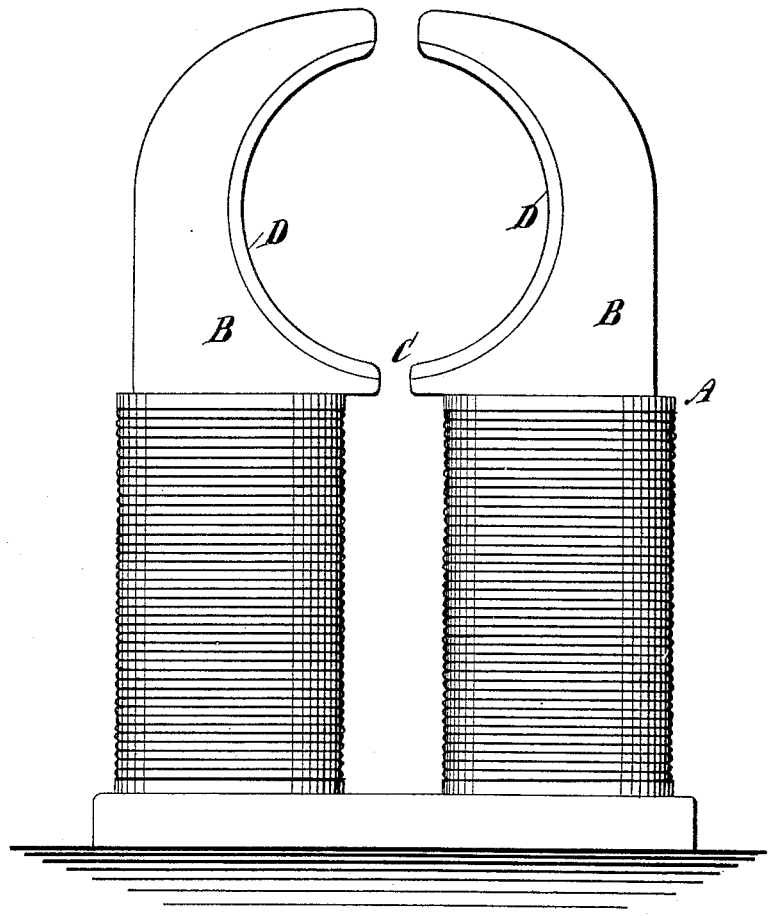
WITNESSES:
C. Neveux
G. M. Hopkins
INVENTOR
C. P. Turner,
BY Munn & Co
ATTORNEYS.

UNITED STATES PATENT OFFICE.

CHARLES P. TURNER, OF NEW YORK, N. Y.

DYNAMO-ELECTRIC MACHINE AND ELECTRIC MOTOR.

SPECIFICATION forming part of Letters Patent No. 578,280, dated March 2, 1897.

Application filed November 25, 1895. Renewed July 11, 1896. Serial No. 598,906. (No model.)

*To all whom it may concern:*

Be it known that I, CHARLES P. TURNER, of New York city, in the county and State of New York, have invented new and useful Improvements in Dynamos and Electric Motors, of which the following is a full, clear, and exact description.

The magnetic permeability of iron used in the field-magnet cores of dynamos and motors is much affected by the presence in the iron of carbon, phosphorus, and other impurities, which decrease the power of the field-magnets for creating lines of force. Alloying iron with other metals also causes losses which are considerable. The object of my invention is to partly or wholly prevent these losses, and thus to increase the efficiency of the dynamo or motor.

My invention consists in the combination, with the polar extremities of the cast or wrought iron field-magnet, of a facing of pure iron on the surface adjacent to the armature, all as will be hereinafter more fully described.

Reference is to be had to the accompanying drawing, forming a part of this specification, in which the figure is a side elevation of a field-magnet to which my improvement has been applied.

In carrying out my invention I prepare the field-magnet A for use in connection with my improvement by forming the polar extremities B with an opening C, which is enough larger than the armature to allow for the electrolytic deposit on the concave surfaces adjoining the armature of a coating of pure iron, and upon the said surface I deposit electrically a coating D of pure iron. This coating of iron, being homogeneous throughout, insures greater permeability than can be realized from the best forgings or castings not provided with my improvement.

The iron shell or facing D is deposited electrically in the way well known in the arts from an electrolyte consisting of iron in chemical solution.

It is obvious that I may form the pure-iron faces separately and attach them to the field-magnet by welding in the process of casting.

By the term "chemically-pure iron" as used herein I mean iron which is as pure as iron can be made by known means—electrically-deposited iron, for example.

Having thus described my invention, I claim as new and desire to secure by Letters Patent—

1. The method of increasing the permeability of the field-magnets of dynamos and electric motors, which consists in electrically depositing on the polar extremities of the field-magnet, a coating of iron, substantially as specified.

2. A field-magnet for dynamos and electric motors having the faces adjoining the armature formed of chemically-pure iron, substantially as specified.

3. A field-magnet for dynamos and electric motors, formed of commercial wrought or cast iron with a facing of pure iron formed on the surfaces which adjoin the armature, substantially as specified.

CHARLES P. TURNER.

Witnesses:
 JNO. M. RITTER,
 F. W. HANAFORD.